Dec. 28, 1943.  J. R. CASSELL  2,337,970
DOG LEASH
Filed April 30, 1942
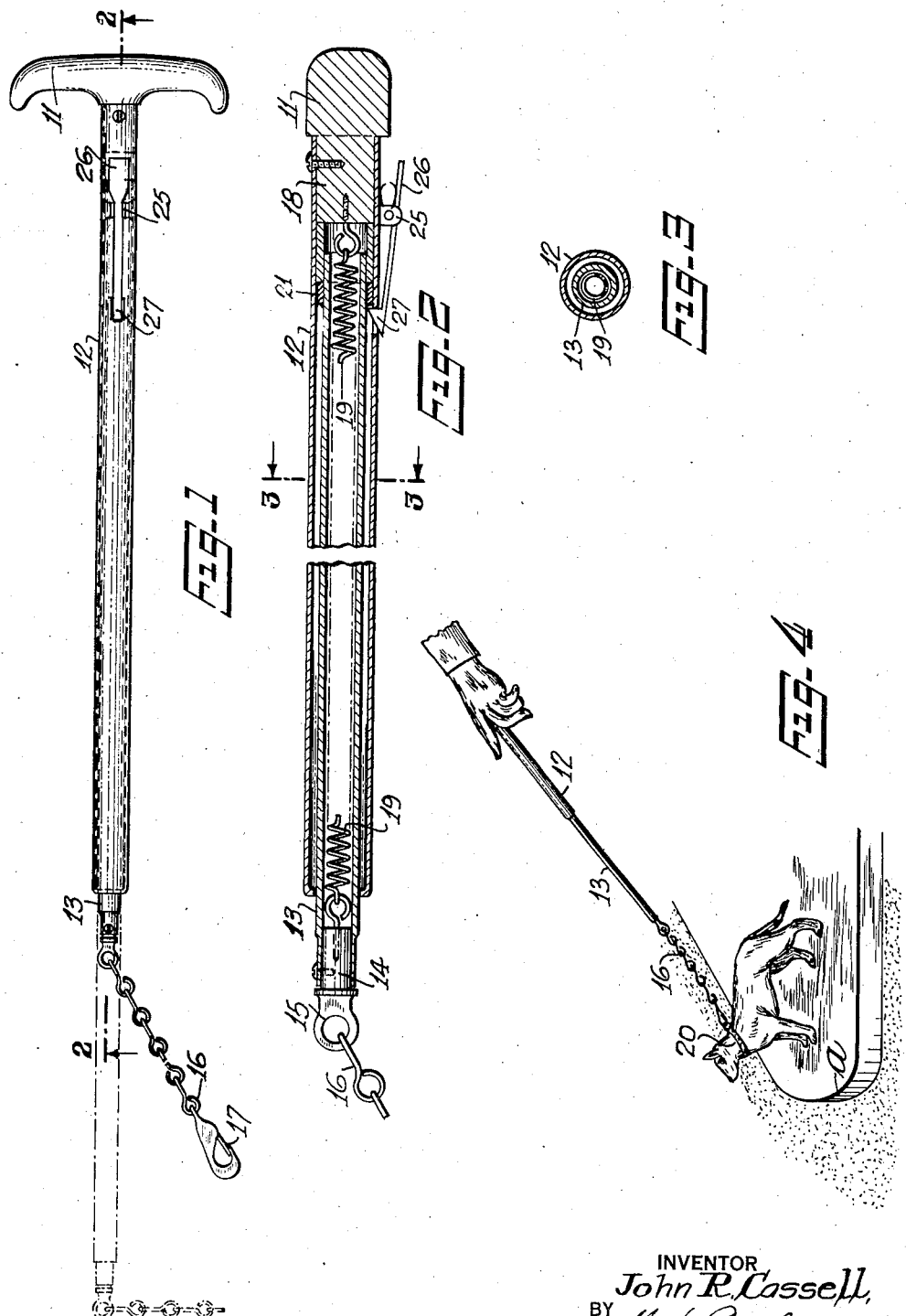
INVENTOR
John R. Cassell,
BY
ATTORNEY Patented Dec. 28, 1943

2,337,970

UNITED STATES PATENT OFFICE 2,337,970

DOG LEASH

John R. Cassell, New York, N. Y.

Application April 30, 1942, Serial No. 441,073

1 Claim. (Cl. 119—109)

This invention relates to dog leashes and it has for an object to provide a leash for a dog which not only restricts the movements of the dog but can be used to direct the dog in a particular direction. Another object of the invention is to provide a rigid leash for a dog which is expansible and is automatically retrieved. Other objects of the invention will be more particularly understood from the following specification and the accompanying drawing, in which, Fig. 1 is a plan view of the dog leash in the retrieved position;

Fig. 2 is a sectional view on line 2—2 of Fig. 1;

Fig. 3 is a cross section on line 3—3 of Fig. 2, and

Fig. 4 shows one method in which the leash may be used.

The common form of dog leash comprises a flexible lead for the dog of a limited length which restricts the movement of the dog only by the limits of the leash. The result is that the leash becomes readily entangled with other objects and the dog cannot be directed away from the person leading the dog. The present invention comprises a telescopic tube with a handle at one end and with a retrieving spring in the interior of the tube. The outer end of the tube is provided with a short, flexible, connection which is hooked to the dog's collar. When the dog pulls directly away from the leader the telescopic tube is expended, increasing freedom of movement in this direction and when the dog returns the automatic retriever reduces the length of the connection. The retrieved leash is compact and easily carried around. An important advantage arising from the use of this leash is due to the fact that it can be used to control the direction of the dog's movement. The user, by the handle, directs the rigid telescopic tube in the direction desired and in this way can direct the dog's movement away from himself as, for instance, directing the dog towards the gutter when the user is on the sidewalk.

In the drawing, 11 is the handle, 12 is the outer telescopic tube secured to the handle 11 by the plug 18, 13 is the inner tube sliding within the tube 12 and provided at the outer end with the plug 14 terminating in the eye 15, to which the chain 16 is secured, having the hook 17 which hooks on the dog's collar 20. A retrieving coil spring 19 extends between the sockets 14 and 18 and permits the tubes to move freely relative to each other with a bias tending to move the tube 13 within the tube 12. It should be understood that the device may be made from several tubes telescoping within each other and provided with stops as at 21 to limit their outward movement as commonly used in telescopic constructions.

The short, flexible connections 16 is provided between the end of the rigid tube and the dog's collar to provide limited freedom for the dog and to keep the end of the tube from injuring the dog. By the use of the handle 11 the operator can direct the rigid part of the leash as in Fig. 4 and force the dog to the curb at $a$ without getting off the sidewalk.

In cases of emergency it may be necessary to shorten the leash to the length of one of the telescopic sections and prevent it from expanding. For this purpose a latch is provided at 27 which engages the collar 21 secured to the inner tube 13 and is pivoted at 25 to the outer tube 12. A thumb piece is provided at 26 on this latch convenient to the handle so that it may readily be released. The latch normally holds the device in the contracted position.

Having thus described my invention, I claim:

A leash of the character described comprising an outer tubular member, provided at its forward end with an inwardly extending flange, a handle secured to the other end of the tubular member and having a shank portion extending into the tubular member, an inner tubular member telescopically mounted within the outer tubular member and having an exterior diameter substantially equal to the diameter of the flange portion of the outer member, an abutment collar on the rear end of the inner tubular member and fixed thereto in spaced relation to the end thereof, an abutment sleeve fixed in the outer tubular member engaged with the handle shank and adapted to be engaged by the abutment collar, a leash connection block fixed within the forward end of the inner tubular member, a tension spring located within the inner tubular member and having connections with the handle shank and leash connection block, said outer member having a slot in the end thereof adjacent the handle, a latch pivotally mounted on the outer side of the outer tubular member and projecting through said slot in the path of said abutment collar and adapted to releasably secure the inner tubular member in retracted position within the outer tubular member to provide a rigid leash, and means to connect the leash connection block to the harness of an animal.

JOHN R. CASSELL.